United States Patent [15] 3,668,398
Doering [45] June 6, 1972

[54] SYSTEM AND METHOD FOR FACILITATING THE OPERATING SET-UP OF A RADIATION GAUGE

[72] Inventor: George I. Doering, Columbus, Ohio
[73] Assignee: Industrial Nucleonics Corporation
[22] Filed: Dec. 26, 1968
[21] Appl. No.: 787,157

[52] U.S. Cl. .................................................... 250/83.3 D
[51] Int. Cl. ........................................................... G01t 1/16
[58] Field of Search .................... 250/83.3, 83.3 D, 83.6 W

[56] References Cited

UNITED STATES PATENTS 2,790,945   4/1957   Chope ............................. 250/83.3 X
3,244,881   4/1966   Hansen et al. ........................ 250/83.3

Primary Examiner—James W. Lawrence
Assistant Examiner—Davis L. Willis
Attorney—Lowe and King, William T. Fryer, III and C. Henry Peterson

[57] ABSTRACT

Disclosed are a system and method for facilitating the setup of a nucleonic gauge and automatic controller for measuring and controlling the thickness of a material. The gauge includes conventional calibration circuits having variable voltage dividers set in accordance with the expected operating points for the material thickness center scale and gauge sensitivity. In one embodiment, the sensitivity and operating point voltage dividers as well as the automatic controller set-point voltage divider are set with the aid of an auxiliary bridge including additional voltage dividers ganged with the voltage dividers of the gauge calibration circuits. In another embodiment, one of the auxiliary bridge voltage dividers has a logarithmic response, enabling calibration for different materials to be established by changing the input voltage to the auxiliary bridge.

18 Claims, 5 Drawing Figures

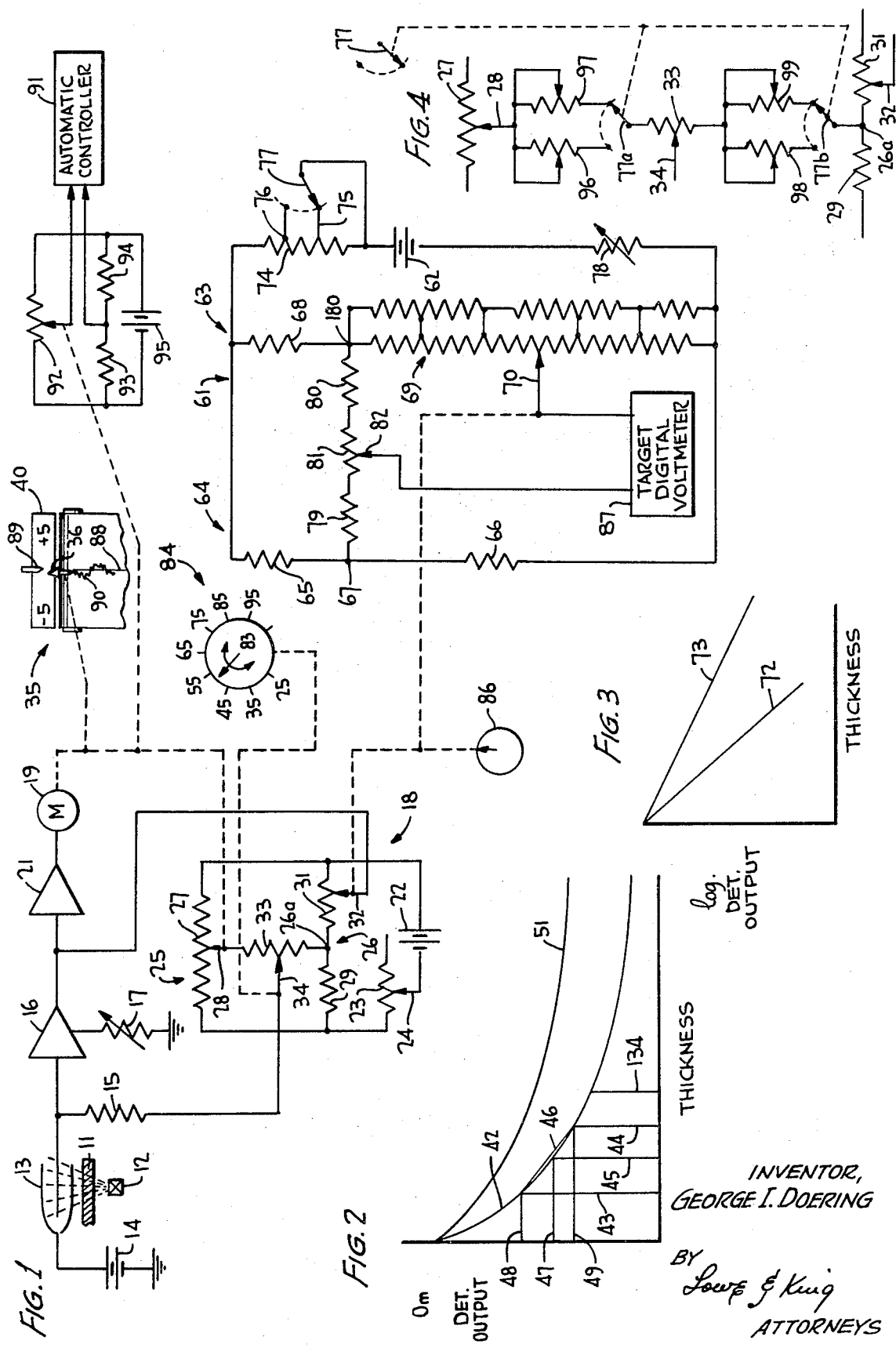

INVENTOR,
GEORGE I. DOERING

SYSTEM AND METHOD FOR FACILITATING THE OPERATING SET-UP OF A RADIATION GAUGE

The present invention relates generally to penetrating radiation gauges utilized in industrial process measuring and control systems and, more particularly, to such a radiation gauge wherein operating point, sensitivity, and where appropriate, automatic control set-point adjustments are made in response to target indications.

Penetrating radiation gauges are commonly utilized, for example, to measure the weight per unit area, thickness or density of a material while it is being manufactured. These gauges are generally of the type that include a source for emitting X-rays, gamma rays, beta rays, or other forms of penetrating nucleonic radiation. Gamma rays, for example, are provided by a source of radioactive material, in the form of gamma ray emissive substances. Some of the gamma rays pass through the material being measured to irradiate a radiation detector such as an ionization chamber. The intensity of radiation impinging on the radiation detector may be determined, inter alia, by the thickness of a material positioned between the source and detector, whereby the detector derives an output current that is a function of material thickness, assuming known density and composition. Gamma ray gauges are frequently employed for measuring the thickness of metals, such as steel, during manufacture.

One typical prior art radiation gauge for measuring the thickness of metals, such as steel, includes a feedback bridge-type circuit including provision for establishing gauge operating point and sensitivity dependent upon the expected thickness of the material being measured and the desired range of thickness values to be presented on the scale of the readout device. The gauge response sensitivity varies as a function of material thickness because of the exponential characteristic of penetrating radiation absorption versus thickness. Commonly over a practical measuring range of thickness values the exponential characteristic curve may be closely approximated by a straight line. The slope of the straight line varies, depending upon the thickness of the material being measured, whereby it is necessary to change the effective slope of the response of the gauging equipment as different thickness ranges or operating points are being considered. When the operating point is to be changed it has been the practice to effectively change the point in the bridge which provides a reference potential so that the gauge operating range is centered about a center scale thickness.

In the past, one of the general techniques utilized for establishing the center scale thickness and slope or sensitivity characteristics in the bridge feedback network has involved using first and second continuously variable setting voltage divider potentiometers for the center scale and gauge sensitivity adjustments respectively. For a particular measuring range and type of material, an operator refers to calibration tables, having numerous entries, to determine the potentiometer settings. The operator is thus likely to make errors in selecting the proper table, reading the setting numbers and in positioning the potentiometers. Because the potentiometer settings are expressed in arbitrary numbers and derived empirically, to the operator there is no meaningful relationship between the material thickness and the center scale and sensitivity settings.

According to another prior art technique frequently employed, each of the two potentiometers is replaced by a multiplicity of tapped resistor voltage dividers selected by a range switch and perhaps a composition switch. In this arrangement, the readout indicator of the gauge, which is usually a strip-chart recorder, has a corresponding multiplicity of scales, each scale being graduated and numbered with the proper thickness values for the corresponding measuring range. In many cases, so many ranges and associated sets of numbers are required that it has not been possible to print the numbers on the conventional scales adjacent to the moving pointer or indicator of the recorder, and the excess scale numbers have had to be placed on the glass door of the recorder, for example.

In using this system, when the operator was instructed to run a particular type of material with a certain target thickness, he had to locate the appropriate thickness scale among the multiplicity thereof, locate and set the corresponding range switch position and set the target indicator to the particular position, with reference to the properly numbered scale, to establish his operating target. Typically in this set-up operation the operator had to move his eyes to the scales, to the range switch, to the target knob, back to the scales, and thence to the graduation marks on the master scale, with each eye and hand movement involving the possibility of error, confusion and loss of time.

In accordance with the present invention, a more facile approach to establishing the operating point, sensitivity and target settings of the gauge is attained by providing an auxiliary bridge having a response similar to the characteristics of the gauge and its calibration circuits. The auxiliary bridge is preferably associated with a digital voltmeter responsive to voltage dividers that derive outputs representing the thickness values or other material property values associated with the gauge sensitivity, center scale and manual or automatic control target settings, regardless of the scale used and the type of material being measured. One or all of the auxiliary bridge sensitivity, center scale and target voltage dividers are mechanically coupled to the corresponding voltage dividers in the gauge and controller calibration circuits, whereby adjustment of the dividers in the auxiliary bridge to achieve a desired target thickness reading on the digital voltmeter results in corresponding adjustment of the dividers of the calibration circuits.

According to one embodiment of the present invention, the number of voltage dividers in the auxiliary and feedback bridges is minimized and the need for complex and laboriously implemented set-up procedures using calibration tables is obviated. The requirement for tables and more than a pair of voltage dividers is eliminated by providing a logarithmic response for the auxiliary bridge to provide a characteristic similar to the exponential response of the gauge measuring circuit, including, in one arrangement, the feedback bridge. The logarithmic response enables the exponential characteristics of the gauge and feedback bridge to be translated to straight-line, linear variations in the output of the auxiliary bridge. Thereby, a simple selection of the voltage fed to the auxiliary bridge enables the response thereof to correspond with the response of the gauge and feedback bridge for different materials.

According to another embodiment of the present invention, different ranges in the auxiliary and feedback bridges are set by a plurality of switched voltage dividers. One set of voltage dividers is included in the auxiliary and feedback bridges for each of a plurality of center scale thickness operating points and material compositions. The settings of the voltage dividers in the auxiliary bridge establish appropriate center scale and sensitivity settings in the feedback bridge, while the adjustment for establishing the exact setting for the target indicator or automatic controller set-point is provided with another potentiometer voltage divider in the auxiliary bridge. The auxiliary bridge vernier potentiometer is adjusted until a digital voltmeter responsive to voltages in the auxiliary bridge provides a reading which corresponds to the desired or target thickness of a sheet being measured.

It is, accordingly, an object of the present invention to provide a new and improved system for and method of setting the calibration adjustments in a penetrating radiation gauge utilized for measuring and controlling the properties of materials produced by industrial processes.

It is another object of the invention to provide a new and improved system for and method of adjusting the sensitivity and center scale settings of voltage dividers in the calibration circuits of a penetrating radiation gauge in accordance with a direct, digital, numerical visual indication of target value in the actual units of measurement.

Another object of the present invention is to provide a new and improved system for and method of adjusting the sensitivity, center scale and visual or automatic control target of penetrating radiation gauges particularly adapted for measuring the properties of materials such as metals wherein the need for lengthy look-up tables or complicated range and target set-up procedures is obviated.

A further object of the present invention is to provide a system for and method of establishing the center scale and sensitivity settings of a feedback bridge included in a radiation gauge by monitoring signals indicative of a desired material property as derived from an auxiliary circuit.

The above and still further objects, features and advantages of the present invention will become apparent upon consideration of the following detailed description of several specific embodiments thereof, especially when taken in conjunction with the accompanying drawings, wherein:

FIG. 1 is a circuit diagram of a nuclear radiation gauge in accordance with one form of the present invention;

FIGS. 2 and 3 are plots representing response curves of the system of FIG. 1, in accordance with linear and semi-logarithmic scales;

FIG. 4 is a fragmentary circuit diagram showin a modification of a portion of the bridge circuit 18 of FIG. 1.

Figure 5:
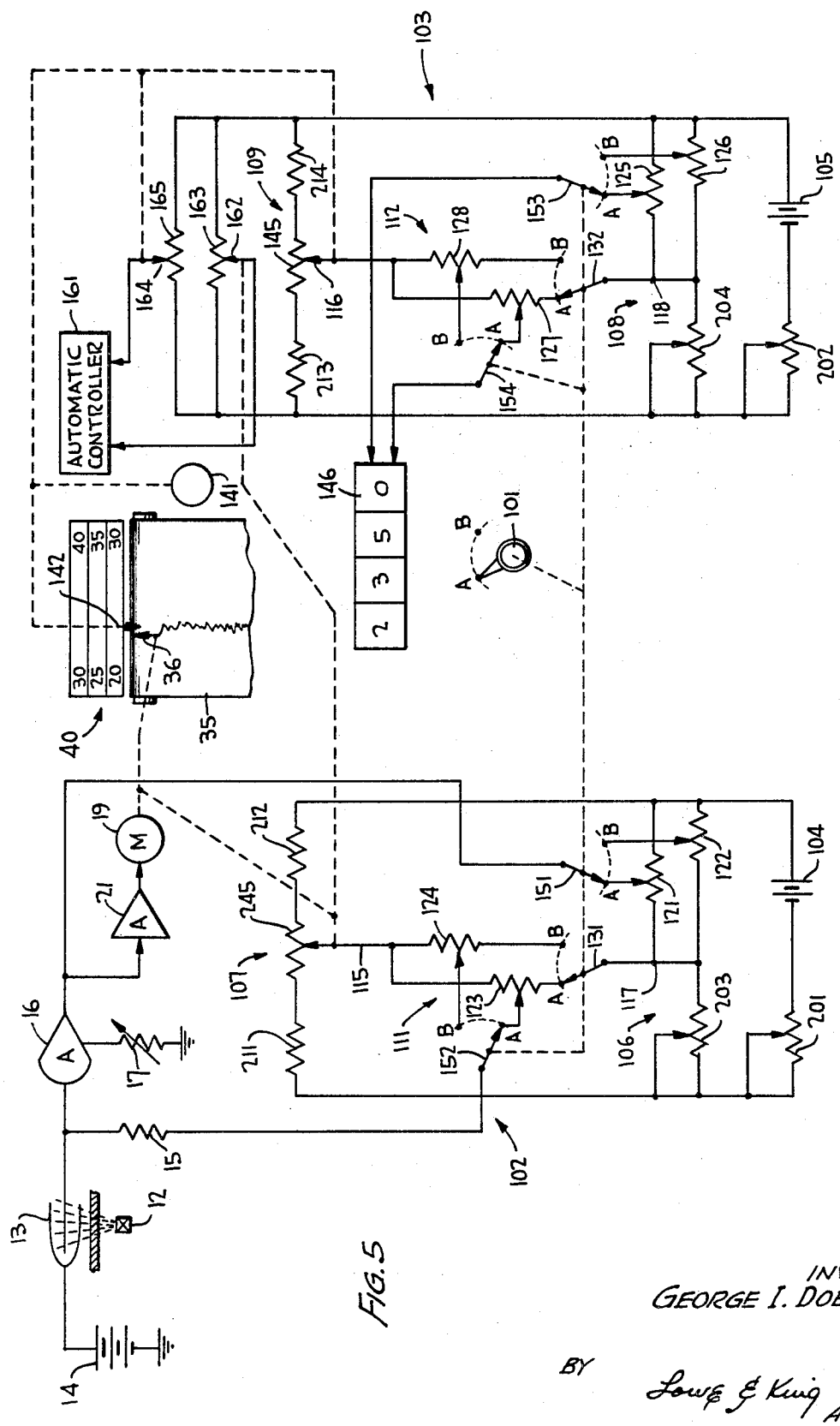
FIG. 5 is a circuit diagram of a preferred embodiment of the invention wherein sensitivity and center scale adjustments are varied together and a vernier adjustment for visual and automatic control target is provided.

Reference is now made to FIG. 1 of the drawings wherein there is illustrated a system for measuring the thickness of metal sheet 11 with a radiation gauge including a probe containing penetrating radiation source 12 and radiation detector 13. Penetrating radiation source 12 may be of any suitable type, such as a gamma ray source. For the specific embodiment described in conjunction with the figures of the present invention, source 12 is considered to be an isotope of americium, to provide gamma radiation that is absorbed by metal sheet 11 in an exponential manner over a relatively wide range.

Detector 13 is energized by a d.c. voltage source 14, whereby the detector derives a d.c. output current of relatively low amplitude. The output current of detector 13 is translated into a variable d.c. voltage by "high meg" resistor 15. Variations in the voltage developed across high meg resistor 15 are amplified by d.c. amplifier 16, which is preferably of the electrometer type. Amplifier 16 includes a variable resistor 17 in the input biasing circuit thereof, whereby the amplifier output voltage can be adjusted to provide a zero output for zero input during a standardization operation which occurs periodically. The output voltage of amplifier 16 is fed in parallel to a feedback circuit 18 and servo motor 19, the latter connection being by way of power amplifier 21.

The feedback circuit includes a bridge circuit 18 energized by d.c. voltage source 22 through variable resistor 23. Resistor 23 includes tap 24 which is adjusted during standardization, after resistor 17 is adjusted. Tap 24 is set to a position whereby the applied voltage across the bridge has a predetermined proportional relationship to the voltage across the high-meg resistor 15 for a standard material condition being between source 12 and detector 13; typically, the standard condition is established with only air in the path between the source and detector.

The remainder of bridge network 18 includes a pair of parallel circuits 25 and 26; the former circuit includes slidewire potentiometer 27 having slider 28, while the latter includes fixed resistor 29 connected in series with potentiometer 31, having slider 32 that is set to a position related to the particular material thickness to be indicated at the center of the thickness scale on the readout device for the gauge. Slider 28 of slidewire potentiometer 27 and a point 26a between resistor 29 and potentiometer 31 are connected together by potentiometer 33, on which is slider 34, having a position selected to provide the proper gauge sensitivity or span required for the particular material being gauged and the thickness range over which the gauge is operating.

The slider 28 is positioned by a mechanical coupling to the shaft of servo motor 19 in accordance with the variations in the current fed by detector 13 to the amplifier 16 and high-meg resistor 15. The position of the shaft of motor 19 and the thickness of sheet 11 are translated into a permanent visual indication by strip chart recorder 35, having a pen and pointer assembly 36 which is variably translated across the width of the chart in response to the rotation of the shaft of motor 19.

The response of detector 13 versus the thickness of a typical sheet 11 is illustrated by characteristic curve 42, FIG. 2. Curve 42 defines the exponential relationship of detector output to material thickness. When the maximum value of the detector output, with only air in the radiation path between source 11 and detector 13, is obtained during the standardization operation, slider 24 is adjusted so that the maximum voltage available across potentiometer 31 between slider 32 and the center point 26a of the bridge, commensurate with the value $O_M$, is equal and opposite to the voltage developed across high-meg resistor 15, in the manner described in U.S. Pat. No. 2,829,268.

With the system in operation measuring the thickness of sheet 11, the gauge response lies between predetermined, fixed boundary values, such as are defined by vertical lines 43 and 44. The center of the range, which may be referred to as center scale thickness, indicated by vertical line 45, is set in a manner described infra according to the present invention, by adjusting the position of slider 32 so that the voltage between the slider and point 26a is equal to the voltage developed across resistor 15 as a result of the detector output represented by horizontal line 47. To enable the gauge output to follow the slope of curve 42 in the range between lines 43 and 44, the sensitivity or span must be fixed. The required sensitivity of the gauge, indicated by the slope of straight line segment 46, is established by adjusting the position of slider 34 on potentiometer 33, as described infra, so that as recorder pen 36 and slidewire tap 28 are driven to their extreme left and right positions the bridge 18 output voltage between sliders 32 and 34 will vary between boundary values corresponding to the detector outputs represented by horizontal lines 48 and 49 (FIG. 2) respectively.

With sliders 32 and 34 set in positions corresponding with the center 45 between the range boundaries 43 and 44 and commensurate with the slope of line 46, a sheet 11 having a thickness equal to the center scale thickness value causes motor 19 to drive the recorder pen 36 to the center of the recorder chart, a position commensurate with the thickness value represented by vertical line 45. The output shaft of motor 19 also drives the pen 36 to limit values commensurate with lines 43 and 44 in response to variations in the thickness of sheet 11 to these limit values. The pen is deflected to the left and right scale edge markings on the recorder strip chart in response to thicknesses commensurate with the boundary values indicated by lines 43 and 44, respectively.

During the use of a radiation gauge of the type described, it is frequently necessary to change the center scale and sensitivity settings determined by sliders 32 and 34. Such instances occur, for example, when the same gauge is utilized for measuring cold rolled metal sheets having different target thicknesses. It is also necessary to establish a new set of values for the positions of sliders 32 and 34 if the gauge is to be utilized for measuring the thickness of a sheet having a different metal composition. Each composition of metal has a different radiation absorption characteristic, with typical examples of such characteristics being illustrated in FIG. 2 by exponential curves 42 and 51. Generally, when a different metal is to be measured with source 12 and detector 13 it is necessary to change the gauge center scale calibration adjustment 32. Accompanying the gauge center scale change is a slope or sensitivity change due to the difference between characteristic curves 42 and 51. The gauge sensitivity is altered by adjusting potentiometer 34 to compensate for the different slopes of the absorption characteristics within the same operating ranges.

All of the apparatus specifically described to the present is known in the art and is disclosed in U.S. Pat. Nos. 2,790,945 and 2,829,268, issued to H. R. Chope. While systems of the type disclosed by the Chope patents function admirably to measure the thickness of a metal sheet, the human operator who is required to perform the gauge calibration adjustment is beset by certain difficulties relating to setting the positions of range and sensitivity sliders 32 and 34. The problems are particularly troublesome in establishing the center scale and sensitivity settings for penetrating radiation gauges utilized in conjunction with metals applications. In such applications, it is necessary to employ lengthy and numerous calibration tables for the numerous alloys which may be measured by a probe including a nuclear source 12 and detector 13. Usually, a separate table is provided for each alloy. The table for a particular alloy lists a number of thickness ranges which are available, e.g., 25–35 mils, 30–40 mils, 35–45 mils, 40–60 mils, etc. For each of the listed ranges there is given a corresponding pair of center scale and sensitivity values, usually expressed in arbitrary numbers from 0 to 1,000, which must be accurately set on numbered dials coupled to potentiometers 31 and 33 to indicate the positions of the sliders 32 and 34 thereof. It is one of the objects of the present invention to provide a system and method wherein such extensive tables need not be employed to set potentiometer sliders 32 and 34 for different thicknesses and materials.

In the embodiment of FIG. 1, the object is attained by setting sensitivity slider 34 in accordance with an approximate thickness adjustment and adjusting the position of center scale slider 32 to a position which corresponds to a desired target thickness as monitored with a digital voltmeter or the like. The settings of potentiometer sliders 32 and 34 are adjusted in a facile manner regardless of the material being monitored.

To these ends, there is provided auxiliary bridge circuit 61, which has a response similar to the characteristics of the measuring gauge (source 12, detector 13 and the circuitry of and connected to bridge 18). Bridge circuit 61 is energized by d.c. source 62 which drives a pair of parallel circuits 63 and 64; the latter circuit including a pair of fixed resistors 65 and 66, connected together at point 67. Circuit 63 comprises fixed resistor 68, as well as log-tapered potentiometer 69, including potentiometer slider 70.

Potentiometer 69 has a logarithmic resistance versus position characteristic to translate the exponential characteristics of curves 42 and 51 into straight line log versus thickness characteristics, indicated by lines 72 and 73, FIG. 3. To enable bridge 61 to provide a response in accordance with either of curves 72 or 73, the voltage fed to the bridge from source 62 is selectable at will by resistor 74, having taps 75 and 76 which are selectively connected to the battery by manually activated switch contact 77. With contact 77 engaging tap 75, the resistance in circuit of tapped resistor 74 is relatively large, whereby the characteristic curve indicated by line 72 is achieved. To vary the characteristic slope of circuit 61 and enable the bridge to simulate a gauge responsive to a material indicated by curves 51 and 73, contact 77 engages tap 76. To compensate for fluctuations in the voltage of source 62 and maintain the voltage supplied to circuits 63 and 64 relatively constant, except for variations due to positioning contact 77, variable regulating resistor 78 is connected in series with the source and the bridge circuit.

Circuit 63 of bridge 61 represents, to a certain extent, circuit 26 of bridge 18. The logarithmic response of potentiometer 69 converts the exponential thickness versus voltage response at slider 32 to the linear characteristics indicated by lines 72 and 73, FIG. 3.

A network including series resistors 79 and 80, as well as potentiometer 81, is connected between point 67 and midpoint 180 of circuit 63. Resistors 65 and 66 have values relative to the resistance values of resistor 68 and potentiometer 69 such that point 67 is at a predetermined potential with respect to point 180 and current flows through resistors 79 and 80 and potentiometer 81. Potentiometer 81 includes a tap 82 which is adjusted to a setting commensurate with the required vertical translation of curves 72 and 73 whereas the potentiometer 69 is padded to achieve the required logarithmic slope of the curves.

Cooperating with knob 83 to indicate the position thereof is arcuate scale 84 having indicia in terms of sheet thickness in mils. An operator rotates knob 83 to the indicia on scale 84 as close as possible to the desired target thickness for the sheet being processed. In response to rotation of knob 83, slider 34 of bridge 18 is translated to establish the sensitivity of the bridge. The bridge sensitivity is controlled in response to rotation of knob 83 because of differences in the slope of the characteristic curve, e.g., curve 42 or 51 for different thickness ranges to be measured.

Slider 32 of bridge 18 is then adjusted to provide the center scale target value for the desired sheet thickness range. The slider of potentiometer 32 is set by rotating knob 86, ganged to sliders 32 and 70 on potentiometers 31 and 69, respectively. The voltage difference between sliders 70 and 82, directly proportional to the center scale target thickness of sheet 11, is monitored by target digital voltmeter 87. Knob 86 is adjusted until the position of slider 70 is set so that the reading of voltmeter 87 is equal to the target thickness value desired for sheet 11.

The gauge is now calibrated so that the center line 88 of the recorder chart and the center mark on the recorder scale 40 correspond to the desired target thickness value which appears as the reading on digital voltmeter 87. While the center line 88 is usually preprinted on the recorder chart, it may be emphasized by a target pen which is a part of a target pen and pointer assembly 89. This assembly 89 occupies a fixed position in the center of the scale and chart, and the process is controlled either manually or automatically to maintain the thickness of sheet 11 such that the measuring pen and pointer 36 are maintained as close as possible to the center thickness target line 88. When the thickness is on specification, the position of the measuring pen and pointer coincides with the position of the target pen and pointer 89, and the average of the trace 90 made by the measuring pen is centered on the target line 88.

When the thickness of sheet 11 is off specification, or different from the desired target thickness as established by the reading on digital voltmeter 87, the extent of the sheet thickness deviation is indicated by the degree of departure of the measuring pen and pointer 36 from the center line 88. The numbers on scale 40 preferably are arranged to indicate the deviation from the target thickness in terms of percent deviation from target thickness. For example, as shown in FIG. 1, the scale extends from −5 percent deviation at the left end, through 0 percent deviation at the center, to +5 percent deviation at the right end. These percentages are in terms of percent of the target thickness value. When the gauge is calibrated in this manner, using a gamma ray source such as the americium isotope, it is found that the required sensitivity setting of slider 34 is a tolerably linear function of the center thickness or target thickness, and thus a linear arrangement of the indicia on the scale 84 associated with sensitivity knob 83 can be used. The percent deviation signal is also desirable for the purpose of providing an input signal to certain automatic controllers, particularly adapted for the control of rolling mills, such as that described in U.S. Pat. No. 2,999,406, issued Sept. 12, 1961 to Richard F. Warren.

In FIG. 1, an automatic controller indicated by box 91 receives its error signal from a bridge circuit having a potentiometer 92 in one branch, a pair of equal resistors 93 and 94 in the other branch and energized by a d.c. voltage source 95. The tap of potentiometer 92 is mechanically coupled to servo motor 19 and pen and pointer 36 so that no voltage output is obtained from the bridge when the gauge reading is at the center line 88. However, when a deviation exists, a positive or negative signal depending on the direction and extent of the deviation is provided to controller 91 in the conventional manner.

When there is a substantial difference between calibration curves as shown by curves 42 and 51 of FIG. 2, a single calibration for establishing the sensititity setting on potentiometer 33 with respect to the indicia on scale 84 may not suffice. Accordingly, to provide for changing from one composition to another substantially different composition, the center arm of the bridge 18, which in FIG. 1 consists of the potentiometer 33, can be modified as shown in FIG. 4.

In the modification of FIG. 4, a plurality of suppression rheostats 96–99 are installed at both ends of the sensitivity potentiometer 33 and arranged to be switched in selectively by additional decks of composition switch 77 shown in the auxiliary bridge circuit 63 of FIG. 1. With rheostats 97 and 99 switched into the circuit as shown by respective switch contacts 77a and 77b, the resistance of rheostat 97 determines the minimum available sensitivity of the gauge which can be obtained by moving slider 34 to its upper limit. With reference to curve 42, FIG. 2, if the thickness range between vertical lines 43 and 44 is to be measured, this range of thickness corresponds to a large range of the detector output signal between horizontal lines 48 and 49. This requires that tap 34 should receive a large portion of the voltage changes available from slidewire tap 28, so that the measuring pen 36 will move only a small distance for a given change in detector output. That is, a low sensitivity is required. Rheostat 97 is adjusted so that when knob 83, FIG. 1, is set for the smallest available center thickness, with the slider 34 near the top end of potentiometer 33, the required minimum sensitivity obtained will be correct for the range having that center thickness.

The resistance of rheostat 99 determines the maximum available sensitivity which can be obtained by moving slider 34 to its lower limit. Greater sensitivity is required for larger center thickness values because of the decreased slope of the absorption curve as at 42, FIG. 1. Accordingly, when knob 83 is set for the largest available center thickness, with slider 34 near the bottom end of potentiometer 33, rheostat 99 is adjusted so that the required maximum sensitivity obtained will be correct for the range having that center thickness. With the end points of potentiometer 33 thus properly calibrated for the minimum and maximum center thicknesses available according to the indicia 84 associated with knob 83, the intermediate sensitivity values for intermediate center thicknesses will also be properly calibrated according to a linear function relating the sensitivity to the center thickness.

When measuring a different material composition such as that having the absorption curve 51, the composition switch 77 is thrown to another position, as to contact 76, FIG. 1. In addition to changing the voltage across the auxiliary bridge, the switch causes other suppression rheostats as at 96 and 98 to be substituted for rheostats 97 and 99. The latter rheostats are set to calibrate potentiometer 33 to obtain the different sensitivity function required for the different material composition. It is apparent that if necessary for certain gauging applications, some of the resistors and/or potentiometers in the auxiliary bridge 61 can be arranged to be switched or selectively suppressed in a similar manner.

From the foregoing discussion it is seen that once an initial set of calibration adjustments have been made, and since the calibration can be maintained permanently by the periodic standardization procedures well known in the art, the operator has only three simple operations to perform, (1) to select composition by switch 77 if necessary, (2) to set his target thickness using knob 83, and (3) to set his target thickness on digital voltmeter 87 using control knob 86.

Consideration is now given to the preferred embodiment of the invention illustrated by FIG. 5, wherein the two-dial system of FIG. 1 is replaced with a range switching arrangement. This arrangement has the advantage of greater accuracy and an even simpler set-up procedure, although it cannot provide at reasonable cost the almost infinite number of ranges provided by the system of FIG. 1. For purposes of a more facile presentation, the system of FIG. 5 is illustrated to include circuitry for only a pair of different possible ranges; it is to be understood, however, that in an actual system a multiplicity of ranges are provided and that the circuitry is more complex than that illustrated.

In FIG. 5 the separate controls for adjusting sliders 34 and 32 are replaced by multi-position detented switch 101. Switch knob 101 includes a multiplicity of positions, equal in number to the number of ranges required. Each position of switch 101 connects a different set of resistors in the various arms of bridges 102 and 103.

Bridges 102 and 103 include corresponding elements in virtually all respects. In particular, bridges 102 and 103 respectively include center scale networks 106 and 108, bridge arms 107 and 109 parallel to networks 106 and 108, and sensitivity networks 111 and 112 between the bridge arms and center scale networks. Tapped resistors 121, 122 and 125, 126 in networks 106 and 108 are respectively connected to d.c. sources 104 and 105, regulated by variable resistors 201 and 202, bridge balancing rheostats 203 and 204, while potentiometers 145 and 245 in arms 107 and 109 are connected to sources 104 and 105 by centering resistors 211, 212 and 213, 214. The output voltage derived from tap 115 of resistive bridge arm 107 of bridge 102 indicates the magnitude of the sheet thickness deviation from center scale thickness while the output voltage of network 109, at tap 116, indicates the automatic controller set-point deviation from center scale thickness. Bridges 102 and 103 include sensitivity networks 111 and 112 respectively.

In networks 106, 111, 108 and 112 of bridge circuits 102 and 103, there are provided a plurality of tapped potentiometers 121–128 selectively connected in circuit in response to rotation of detented knob 101 to one of a plurality of arcuate positions indicative of center scale thickness values for a like plurality of ranges. The number of potentiometers selectively connected in each of circuits 106, 108, 111 and 112 equals the number of selectable positions for knob 101. The sliders of potentiometers 121–128 are selectively connected in circuit by engagement with one of ganged contacts 151–154 which are driven in response to rotation of knob 101. Each of the sliders of potentiometers 121–128 has a preset position corresponding with the center scale or sensitivity adjustment for a particular range established by rotation of knob 101. The end terminals of potentiometers 123, 124, 127 and 128 in networks 111 and 112 are selectively connected in circuit through ganged switch contacts 131 and 132 which are also driven in response to rotation of knob 101.

The settings of knob 101 enable center scale and sensitivity settings to be established at incremental values only, which incremental values may correspond with sheet thickness increments of five mils for example. The incremental values established by knob 101 are referenced to the center thickness between upper and lower limits in a preferred embodiment. For example, referring to FIG. 2, to establish a gauge thickness range of 20 to 30 mils indicated between lines 43 and 44, FIG. 2, knob 101 is set at position A to establish sensitivity and center scale settings in networks 106, 108, 111 and 112 corresponding with a mid-range or center scale thickness setting of 25 mils, indicated by line 45. In response to rotation of knob 101 so that it engages range B, the center scale setting is changed to correspond with a thickness of 30 mils, indicated by line 44 so that the gauge response extends between 25 and 35 mils, indicated by lines 45 and 134.

Once the range has been established in the system of FIG. 5 in response to rotation of knob 101, the automatic controller setting is made by turning knob 141. Manually activated knob 141 has ganged thereto target indicating pointer 142 of recorder 35, as well as slider 116 on potentiometer 145 of bridge network 109. The position of pointer 142 on recorder 35 provides an indication of the actual target value on the particular scale of recorder 35 selected by setting range knob 101. The target value can be anywhere in the range extending ±5 mils in either direction from the center thickness value established by knob 101, assuming a 10 mil range. The voltage at slider 116 in bridge 103 provides a vernier indication of the target offset from the center thickness value.

In the illustrated position of knob 101, on range A with an assumed center scale thickness value of 25.00 mils, the voltage between the tap of potentiometer 125 and point 118 in network 108 is proportional to a thickness of 25.00 mils. Assuming a center location initially for tap 116, the bridge is initially balanced and the potential at tap 116 is the same as the potential at point 118. Hence the voltage between the taps of potentiometers 125 and 127 is proportional to a thickness of 25.00 mils.

To provide a readout for target equal, for example, to 23.50 mils, knob 141 is rotated so that slider 116 is translated to the right to decrease the potential difference between the A sliders of networks 112 and 108 by an amount corresponding with 1.50 mils. Knob 141 is rotated until the exact desired target thickness is obtained, in accordance with the voltage between the A taps of networks 108 and 112, as monitored by the visual output signal of digital voltmeter 146, having input terminals selectively connected to the taps of networks 108 and 112 under the control of knob 101. As slider 144 is being translated to the right, as viewed in FIG. 5, target indicator marker 142 is translated to the left along the scale of recorder 35 in response to rotation of knob 141. Thereby, the target indicator 142 is properly located with reference to the proper scale on recorder 35.

If it is required to monitor a sheet having a different thickness target and/or one having a different composition from the sheet previously being gauged, the positions of range knob 101 and vernier knob 141 are appropriately changed.

After the gauge sensitivity and center scale settings have been established in networks 111 and 106 in response to activation of knob 101 and the target deviation from center scale thickness has been set in auxiliary bridge 103 and on recorder 35 in response to rotation of knob 141, the gauge is ready for use in gauging and controlling the thickness of sheet 11. For normal gauging and control operations, thickness variations of sheet 11 are translated into rotations of the shaft of motor 19 which drives potentiometer slider 115, pen 36 and the slider 162 of a potentiometer 162 which provides a measure signal potential input to an automatic controller 161 for the processor forming sheet 11. A target value signal potential is derived from slider 164 of potentiometer 165. Potentiometers 163 and 165 are energized by the voltage source 105. The tap 164 of target potentiometer is mechanically coupled to knob 141 so that the target signal potential corresponds to the position of target indicator 142. Automatic controller 161 responds to the difference between the target and sheet thickness potential signals derived from sliders 164 and 162 to control a mechanism of the sheet producing apparatus, such as a rolling mill, to minimize the error between the average value of the sheet thickness and the target thickness. In the alternative the sheet processor could be controlled manually from observations of the positional deviations of pen 36 and pointer 142 of recorder 35.

While there have been described and illustrated several specific embodiments of the invention, it will be clear that variations in the details of the embodiments specifically illustrated and described may be made without departing from the true spirit and scope of the invention as defined in the appended claims.

I claim:

1. In combination with a radiation gauge for measuring a property of a material, said gauge having calibration circuits including calibration potentiometer means for selecting a range of values for said property to be measured in accordance with the setting of said potentiometer means, the improvement comprising auxiliary means responsive to the setting of said potentiometer means for producing a signal indicative of said setting, and means responsive to said signal for producing an indication of a specific target value for said property within said range.

2. Apparatus as in claim 1 wherein said auxiliary means comprises auxiliary potentiometer means coupled to said calibration potentiometer means for producing a voltage indicative of the setting thereof, and wherein said signal responsive means comprises a digital voltmeter which is calibrated in units commensurate with said material property values.

3. Apparatus as in claim 1 wherein said auxiliary means includes an exponential function generator for producing a linear variation in said signal in response to an exponential variation in said setting of said potentiometer means.

4. Apparatus as in claim 1 wherein said calibration potentiometer means comprises a center scale potentiometer and a sensitivity potentiometer, and wherein said auxiliary means includes means producing a first response to the setting of said center scale potentiometer and a second response to the setting of said sensitivity potentiometer whereby said signal varies conjointly with said first and second responses.

5. Apparatus as in claim 4 where wherein said gauge includes means for setting a desired target value for said property, and wherein said auxiliary means includes means producing a third response to said desired target value setting means whereby said signal varies conjointly with said first, second and third responses.

6. Apparatus as in claim 2 wherein said calibration potentiometer means comprises a first plurality of preset potentiometers for establishing a plurality of ranges, and a first switch means for selecting one of said plurality of ranges by switching said preset potentiometers, wherein said auxiliary potentiometer means comprises a second plurality of preset potentiometers and second switch means for switching said potentiometers in said second plurality thereof, and wherein said apparatus includes range selector means coupling said first and second switch means for conjoint operation thereof.

7. In combination with a penetrating radiation gauge for measuring a property of a material and including calibration means for adjusting the gauge sensitivity and center scale values which determine the range of values of said properties to be measured by said gauge, an improvement in the adjusting means comprising: means for deriving first and second signals which are respectively indicative of the settings of the sensitivity and center scale adjustments but which are substantially independent of the response of said gauge to said material during the gauging thereof, and means responsive to said signals and coupled to said adjusting means for deriving an indication of a specific target value within said range for the property being measured.

8. A method of adjusting the sensitivity and center scale settings which determine the range of values to be measured by a penetrating radiation gauge measuring a material property comprising the steps of deriving first and second signals which are respectively indicative of the settings of the gauge sensitivity and center scale adjustments but which are substantially independent of the response of said gauge to said material during the measurement thereof, and combining said signals to derive an indication of a specific target value within said range for the property being measured.

9. The method of claim 8 further including the step of changing at least one of said adjustments until a desired target value is indicated.

10. A penetrating radiation gauge comprising a probe, said probe including: a source of penetrating radiation and a detector responsive to said radiation; a circuit responsive to an output of said detector, said circuit including a feedback path and means for establishing the sensitivity and center scale value of the gauge response; and means for setting the sensitivity and center scale value of the gauge response, said setting means including: a network having a response corresponding with the response to the gauge, said network including means for deriving a signal indicative of the center scale setting of the gauge, means responsive to said signal for deriving an indication of a target value for a property measured by the gauge, first adjustable means for varying the value of said first signal and the center scale setting of the gauge together; and second adjustable means for setting the sensitivity of the gauge.

11. The gauge of claim 10 wherein the gauge has an exponential response to the property, and said network includes means for converting the gauge exponential response to a linear response.

12. The gauge of claim 11 further including means for at will changing the slope of the network linear response to represent a plurality of gauge exponential responses.

13. The gauge of claim 10 wherein: said feedback path includes a first bridge having first and second voltage dividers; and said network includes: a second bridge having third and fourth voltage dividers, the first and second voltage dividers and the third and fourth voltage dividers being respectively connected in corresponding circuit configurations in the first and second bridges.

14. The gauge of claim 13 wherein each of said voltage dividers comprises a potentiometer having a slider.

15. The gauge of claim 14 wherein the gauge has an exponential response to the property and one of said third and fourth voltage dividers is a potentiometer having a logarithmic response to convert the gauge exponential response to a linear response.

16. The gauge of claim 15 wherein said bridge includes an energization voltage source and means for varying the input voltage energizing the bridge to simulate a plurality of exponential responses.

17. The gauge of claim 14 further including means for ganging together the movement of the sliders of potentiometers comprising voltage dividers in said first and second bridges.

18. The gauge of claim 13 wherein each of said voltage dividers includes: impedance means having a plurality of taps, and means for selectively connecting only one of said taps on each impedance means in circuit at a time, said taps being connected in circuit for corresponding ranges.

* * * * *